(12) United States Patent
Sluzewski et al.

(10) Patent No.: US 6,351,353 B1
(45) Date of Patent: Feb. 26, 2002

(54) INTERCONNECT DESIGNS FOR MICROMOTOR, MAGNETIC RECORDING HEAD AND SUSPENSION ASSEMBLIES

(75) Inventors: David A. Sluzewski, Edina; David G. Qualey; Kevin J. Schultz, both of Apple Valley, all of MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/454,206

(22) Filed: Dec. 9, 1999

Related U.S. Application Data (60) Provisional application No. 60/138,944, filed on Jun. 11, 1999.

(51) Int. Cl.[7] .......................... G11B 5/56; G11B 21/24; G11B 5/48
(52) U.S. Cl. ................. 360/294.3; 360/245.8; 360/234.5; 360/234.6
(58) Field of Search ................ 360/294.3–294.5, 360/245, 245.8, 245.9, 234.6, 234.5

(56) References Cited

U.S. PATENT DOCUMENTS

| | | | |
|---|---|---|---|
| 4,520,555 A | 6/1985 | Gyi et al. | 29/603 |
| 4,761,699 A | 8/1988 | Ainslie et al. | 360/103 |
| 4,789,914 A * | 12/1988 | Ainslie et al. | 360/103 |
| 5,657,186 A * | 8/1997 | Kudo et al. | 360/104 |
| 5,781,379 A * | 7/1998 | Erpelding et al. | 360/104 |
| 5,856,896 A | 1/1999 | Berg et al. | 360/104 |
| 5,875,071 A | 2/1999 | Erpelding et al. | 360/104 |
| 5,880,908 A | 3/1999 | Shiraishi et al. | 360/104 |
| 5,883,759 A | 3/1999 | Schulz | 360/104 |
| 5,896,247 A | 4/1999 | Pan et al. | 360/104 |
| 5,896,248 A | 4/1999 | Hanrahan et al. | 360/104 |
| 5,914,834 A * | 6/1999 | Gustafson | 360/104 |
| 5,982,585 A * | 11/1999 | Fan et al. | 360/104 |
| 6,078,473 A * | 6/2000 | Crane et al. | 360/104 |
| 6,122,149 A * | 9/2000 | Zhang et al. | 360/294.5 |

FOREIGN PATENT DOCUMENTS

| | | | |
|---|---|---|---|
| JP | 4-199812 | * | 1/1992 |
| JP | 5-347078 | * | 12/1993 |
| JP | 11-259840 | * | 9/1999 |
| JP | 11-300615 | * | 11/1999 |

* cited by examiner

*Primary Examiner*—William Klimowicz
(74) *Attorney, Agent, or Firm*—Kinney & Lange

(57) ABSTRACT

The present invention is a package for incorporating a micromotor into a head gimbal assembly. The head gimbal assembly includes a slider package and a micromotor package assembled on a load beam. The slider package and micromotor package include circuitry which allow a read/write signal to be conducted from the read/write head on the slider to the load beam. Solder joints form the electrical and mechanical connections between the load beam, the micromotor, and the slider.

20 Claims, 9 Drawing Sheets

INTERCONNECT DESIGNS FOR MICROMOTOR, MAGNETIC RECORDING HEAD AND SUSPENSION ASSEMBLIES

CROSS-REFERENCE TO RELATED APPLICATION(S)

This application claims priority from provisional patent application Ser. No. 60/138,944 filed on Jun. 11, 1999 for "Interconnect Designs For Micromotor, Magnetic Recording Head and Suspension Assemblies" by David A. Sluzewski, David C. Qualey, and Kevin J. Schulz.

BACKGROUND OF THE INVENTION

The present invention relates to interconnect designs and assemblies for head gimbal assemblies and more particularly, to interconnect designs and assemblies which enable a micro electro mechanical system motor (micromotor) to be packaged into a head gimbal assembly.

Disc drives are well known in the art and comprise several discs, each disc having several concentric data tracks for storing data. There is a high demand for increased aerial density of discs, which results in an effort to increase both the number of tracks per inch (TPI) and the number of bits per inch (BPI) on the disc. As a result, there is likewise a demand for a high resolution microactuator to precisely position the head over a selected radial track of the disc. More particularly, as efforts continue to increase track density, the radial spacing between concentric data tracks on the disc decreases. Conventional actuator motors, such as voice coil motors, lack sufficient resolution to effectively accommodate high track-density discs, necessitating the addition of a high resolution head microactuator.

Various microactuator designs have been considered to accomplish high resolution head positioning, including piezoelectric, electromagnetic, electrostatic, capacitive, fluidic, and thermal actuators. Various locations for the microactuator have been suggested, including on the slider itself and at the head mounting block connecting the head suspension load beam to the actuator arm. Locating the microactuators at the head mounting block was not desirable because the microactuators could achieve only limited frequency response in micropositioning the head, due to the relatively large mass being moved by the microactuator motor. More promising are micromotors located on the slider. However, sliders having associated micromotors suffer from several shortcomings which limit their feasibility.

For example, many micromotors are fabricated independently of the slider and subsequently must be attached to the slider. Consequently, the micromotors require additional tooling and assembly steps to attach the micromotor to the slider. This increases the complexity of the manufacturing process and creates additional fabrication steps. Due to the fragile nature and small size of micromotors, it has been prohibitively expensive, or inefficient, or both to manufacture sliders having micromotors in any sort of volume.

Thus, there is a need in the art for a micromotor assembly process which allows micromotors to be incorporated into the slider assembly in high volume without being cost prohibitive.

BRIEF SUMMARY OF THE INVENTION

The present invention is a package for incorporating a micromotor into a head gimbal assembly. The micromotor serves to allow the slider to be more precisely positioned over a selected data track on a disc. The micromotor is incorporated in the head gimbal assembly, and actuation of the micromotor requires that certain electrical connections be made to the micromotor. In addition, the micromotor must be attached to the head gimbal assembly by some form of mechanical connection.

A method of making the electrical and mechanical connections between the head gimbal assembly and a micromotor is through a process of using solder and reflow techniques. A micromotor is attached to a flex circuit, and solder bumps are applied to the surface of the micromotor. The slider is then placed onto the micromotor, and the combined flex circuit, micromotor, and slider are passed through a reflow oven allowing the solder bumps to create the necessary electrical and mechanical connections at solder joints formed between the micromotor, slider, and flex circuit.

Alternately, it is possible to make certain electrical connections by using wire bonding methods to connect the micromotor to a flex circuit. In yet another embodiment, a micromotor is fabricated with a via, which reduces the need for an electrical connection using either a wire bond or a flex circuit.

DETAILED DESCRIPTION

Figure 1:
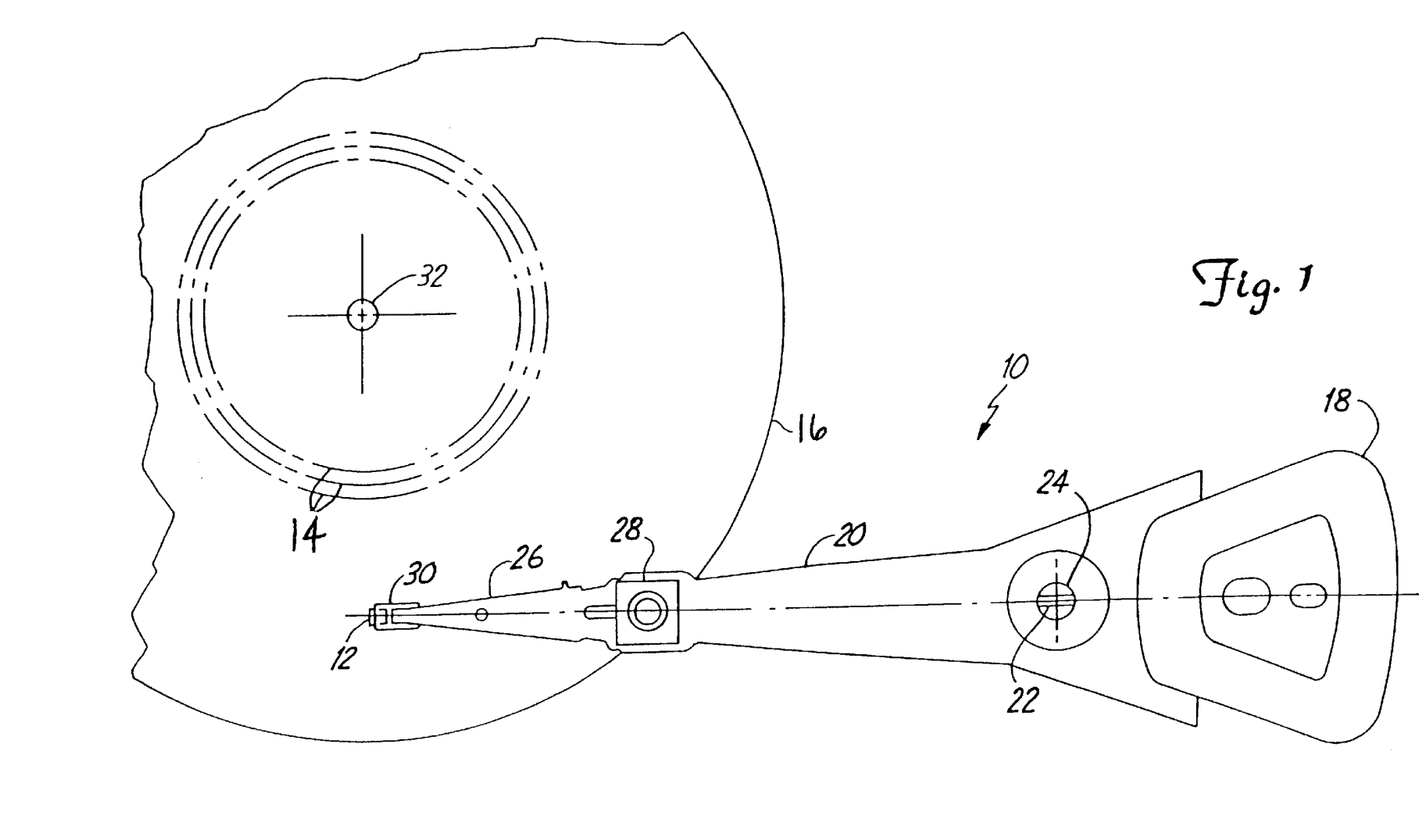
FIG. 1 is a plan view of a disc drive actuation system for positioning a slider over tracks of a disc.

FIG. 1 is a plan view of disc drive actuation system 10 for positioning a slider 12 over a selected data track 14 of a magnetic storage medium 16, such as a disc. An actuation system 10 includes a voice coil motor (VCM) 18 arranged to rotate an actuator arm 20 around axis 22 on a spindle 24. The slider suspension includes a load beam 26 connected to the actuator arm 20 at a slider mounting block 28. A gimbal 30 is connected to the end of the load beam 26, and carries the slider 12. The slider 12 carries a read/write (R/W) head for reading from or writing to the concentric tracks 14 of the disc 16.

The disc rotates about an axis 32 so that windage is encountered by the slider 12 to keep it aloft a small distance above the surface of the disc 16. The slider 12 must be able to closely follow the surface of the disc 16, including any imperfections in the topography of the disc, as the slider 12 travels over the spinning disc 16. It is also important for the slider 12 to closely follow each track 14 located on the disc 16 To improve the ability of slider 12 to follow each track 14, a micromotor may be incorporated into the slider assembly.

Figure 2:
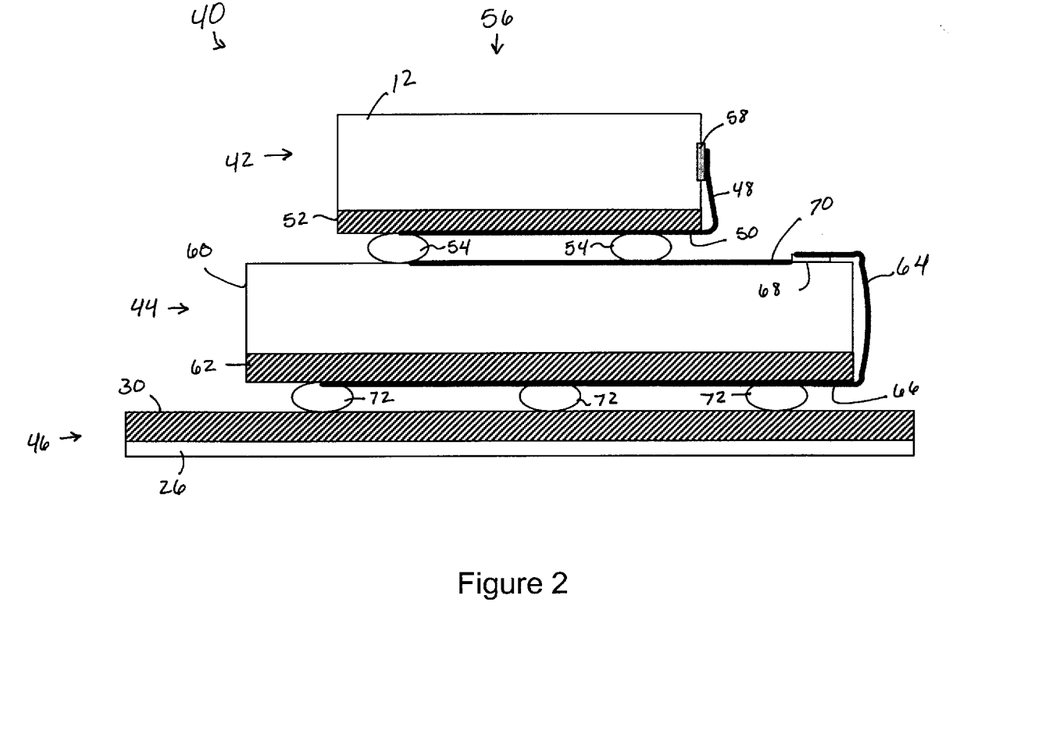
FIG. 2 is a cross sectional of a slider scale package interconnected to a micromotor and assembled on a suspension.

FIG. 2 is a greatly enlarged side view of the slider assembly of FIG. 1 wherein the slider assembly is inverted so that the slider 12 is located above the load beam 26. FIG. 2 shows a slider scale package 42, a micromotor package 44, and a suspension 46. The slider scale package 42 comprises a slider 12, leads 48, traces 50, a slider flex circuit 52, solder bumps 54, an air bearing surface 56, and bond pads 58. The slider flex circuit 52 is located on the bottom of the slider 12 (as viewed in FIG. 2). The slider flex circuit 52 provides the substrate for circuitry which allows electronic signals to travel to and from the R/W head carried by the slider 12.

Using a flex circuit 52 is advantageous because larger bond pad areas can be used to create the connection between the micromotor package 44 and the slider 12. Without the flex circuit 52, all connections would occur on the edge of the slider 12 which carries the bond pads 58; such connections are complex to manufacture and are very fragile due to the extremely small size of the slider 12. Moving the circuitry to a flex circuit 52 located on the larger bottom surface of the slider 42 results in a slider scale package 42 which is much easier to mass assemble and is more robust.

The slider flex circuit 52 comprises traces 50 and leads 48. The traces 50 are typically comprised of gold plated copper formed by either depositing the gold and copper onto the flex circuit substrate, or by selectively etching the substrate to expose the traces 50. The leads 48 are likewise typically made of gold plated copper and refer to that section of the traces 50 when the traces 50 become unsupported by the slider flex circuit 52. The leads 48 connect to bond pads 58 on the slider 12, and the bond pads 58 provide an area for creating an electrical connection between the leads 48 and the R/W head carried by the slider 12. The manner in which the slider 12 carries the R/W head is well known to those skilled in the art. The slider 12 is connected to the micromotor package 44 at the solder bumps 54.

The micromotor package 44 comprises a micromotor 60, micromotor flex circuit 62, leads 64, bottom traces 66, top bond pads 68, and top traces 70. There are several options for the micromotor 60, such as piezoelectric, electromagnetic, electrostatic, capacitive, fluidic, and thermal actuators. Regardless of the specific type of micromotor 60, the function of the micromotor 60 is to position the slider 42 more precisely over a track on a disc. Specifically, the micromotor 60 is actuated to move in a radial motion, and thus also moves the slider 42 due to the connection between the two created by the solder bumps 54. To actuate the micromotor 60, electrical signals must travel between the micromotor package 44 and the suspension 46.

The micromotor flex circuit 62 is located on the bottom surface (as viewed in FIG. 2) of the micromotor 60. The micromotor flex circuit 62 provides the substrate for circuitry which allows electronic signals to travel between the micromotor package 44 and the flex suspension 46. Similar to the slider flex circuit 52, the micromotor flex circuit 62 comprises traces 66 and leads 64. The traces 66 terminate in leads 64 when the traces 66 become unsupported by the micromotor flex circuit 62. Both the traces 66 and leads 64 are preferably formed of gold plated copper. The leads 64 connect to slider bond pads 68 on the micromotor 60. The slider bond pads 68 function as the connection point between the leads 64 and the top traces 70. The micromotor package 44 is connected to the suspension 46 by solder bumps 72.

The suspension 46 comprises both a gimbal 30 and the load beam 26. The load beam 26 provides the main support structure for the slider carrying assembly. The gimbal 30 is connected to the load beam 26, preferably by using a form of adhesive. The gimbal 30 imparts flexibility to the slider 12 and micromotor 60. Specifically, the gimbal 30 is designed to allow the slider 12 to follow the surface of the disc more closely than if the slider 12 were mounted directly on the load beam 26. The gimbal 30 also carries electrical circuitry and allows electrical signals to be conducted along the gimbal 30 to disk drive circuitry located beyond the load beam 26. The gimbal 30 circuitry is used both to actuate the micromotor 60 and transport signals to and from the R/W head on slider 12.

As explained above, the slider scale package 42 is connected to the micromotor package 44 by the solder bumps 54. In a similar manner, the micromotor package 44 is connected to the suspension 46 by the solder bumps 72. The solder bumps 54, 72 create both a mechanical connection, which physically holds the slider 12 and micromotor 60 on the suspension 46; and an electrical connection, allowing electrical signals to pass between the slider 12, micromotor 60, and the suspension 46.

When the R/W head reads data from a disc, the leads 48 conduct a read signal from the bond pads 58 to traces 50, and the traces 50 conduct the read signal to the slider flex circuit 52 on the bottom surface of the slider 12. The traces 50 on the slider flex circuit 52 conduct the signal to the solder bumps 54. The read signal passes through the solder bumps 54 to the top traces 70 on the micromotor 60. Top traces 70 on the micromotor 60 conduct the signal to the slider bond pad 68. From the slider bond pad 68, the signal moves through the leads 64, to the bottom traces 66, and to the solder bumps 72. From the solder bumps 72, the read signal is conducted to the suspension 46, and from the suspension 46, the read signal is conducted to remote circuitry, such as a pre-amplifier, located off the load beam 26. This path is reversed to provide a write signal. Thus, a signal can travel between the R/W head on the slider 12 and remote circuitry on the suspension 46.

The micromotor 60 serves to actuate the slider 12 in a radial direction, allowing the slider 12 to more closely follow data tracks on a disc. In order for the micromotor 60 to be actuated, certain electrical connections are required. The circuitry which actuates the micromotor 60 differs from the circuitry which conducts signals to and from the R/W head.

Figure 3:
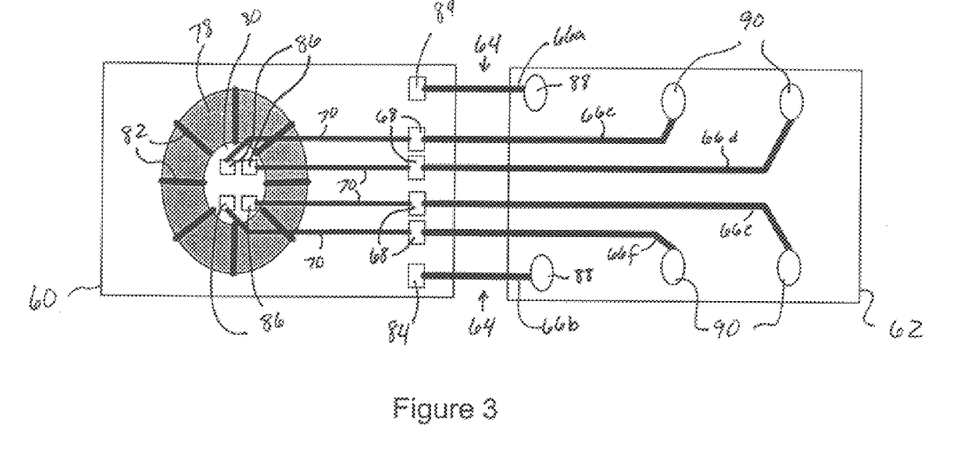
FIG. 3 is a top plan view of a micromotor with a flex circuit before folding.

FIG. 3 is a top plan view of a micromotor package 44 of FIG. 2 in a partially assembled state to more clearly illustrates the electric circuitry located on the flex circuit 62. In FIG. 3, the micromotor package 44 is shown before the flex circuit 62 is folded onto the micromotor 60. The body of the micromotor 60 appears on the left hand side, and the flex circuit 62 appears on the right hand side. The micromotor 60 is depicted in graphical form to approximate the appearance of an actual micromotor 60. The micromotor 60 comprises an aperture 78, and at the center of the aperture 78 is a micromotor structure 80 indicating a rotary motor. Emanating from the center structure 80 are electrostatic motors 82. In operation, an electrostatic charge is built up between selected electrostatic motors 82 causing the motors 82 to repel each other. As selected electrostatic motors 82 repel, a twisting motion results, which causes the mircromotor 60 to move the slider 12 in a corresponding twisting motion.

To actuate the motors 82 on the micromotor 60, electrical signals must be sent to the micromotor 60. On the body of the micromotor 60 appear two actuator bond pads 84. Connected to the actuator bond pads 84 are the leads 64. Electrical signals pass through the leads 64 to bond pads 84, and from bond pads 84, the micromotor 60 is actuated. Bond pads 84 connect to circuitry embedded in the micromotor 60, allowing the electrostatic motors 82 to be actuated based on an applied voltage.

The internal circuitry connecting the bond pads 84 to the motors 82 is created during the fabrication of the micromotor 60, typically using a form of a thin film metalization process. Thus, when the body of micromotor 60 is completed, electrical paths to the center structure 80 and motors 82 are embedded in the micromotor 60 and bond pads 84 provide a convenient connection point for actuation of the micromotor 60.

In addition to the two bond pads 84, there are four slider bond pads 68 and four head bond pads 86. The head bond pads 86 are located on the center structure 80 and correspond to the location of solder bumps 54. The four slider bond pads 68 are connected to four head bond pads 86 by top traces 70. The bond pads 68, 84, 86 and top traces 70 comprise top circuitry which is formed during the fabrication of micromotor 60. The top circuitry on the micromotor 60 is connected to the flex circuit 62 by traces 64.

Located on the flex circuit 62 are traces 66a–66f, two first solder bond pads 88, and four second solder bond pads 90. Solder bond pads 88, 90 correspond to the area where solder bumps 72 are to be deposited. Two traces 66a,66b connect the micromotor actuation pads 84 to the first solder bond pads 88. The other four traces 66c–66f connect the slider bond pads 68 to the second solder bond pads 90. As explained above with reference to FIG. 2, the path of a R/W signal from the slider 12 to the suspension 46 starts at head bond pads 86, then moves along traces 70 to the slider bond pads 68. From the slider bond pads 68, leads 64 allow the read write signal to travel to the second solder bond pads 90. Solder bumps 72 at the second solder bond pads 90 then conduct the R/W signal to the suspension 46.

To ensure proper placement of the solder bumps 72 at the solder bond pads 88, 90, the flex circuit 62 may have a cover coat or a form of solder resist applied to the surface of the flex circuit 62. The cover coat or solder resist is patterned to allow solder to be applied only at the desired solder bond pad areas 88, 90. It also ensures the solder will not form a connection between or bridge two traces 66 if the two traces 66 are located close to each other.

Using solder bumps 54, 72 to create the electrical and mechanical connections between the slider scale package, micromotor package 44, and suspension 46 greatly simplifies the manufacturing process. In the past, it was extremely difficult to produce head gimbal assemblies having micromotors due to the small size and fragility of micromotors. By incorporating flex circuits into the electronic packaging, it becomes possible to mass produce HGA's having micromotors.

To manufacture the present HGAs, sliders 12 are prepared having slider flex circuits 52. The sliders 12 are fabricated in a manner well known to those skilled in the art, and carry a R/W head. Micromotors 60 are prepared which likewise have accompanying flex circuits 62. As described above, micromotors 60 may be any of a variety of small actuators used to allow the slider 12 to more closely follow a track on a disc.

A common type of micromotor 60 is created from a wafer of silicon. The wafer is built up in several layers, and is then subdivided into bars, and the bars are subdivided into individual micromotors 60. As a result, one wafer creates several micromotors 60. The internal circuitry required to connect the micromotor actuation bond pads 84 to the electrostatic motors 82 can be formed during the wafer processes. In addition, the top circuitry (bond pads 68, 84, 86 and top traces 70) located on the micromotors 60 can be formed at the wafer level using a thin film metalization process. The thin film metalization process typically involves either etching or depositing a layer of metal, such as copper or gold, on the wafer to form the traces 70 and bond pads 68, 84, 86 which make up the top circuitry. After any metalization is applied, subsequent layers of materials may further be applied to the wafer. When all metalization processes and layers are completed, the surface of the wafer is smoothed and finished.

Flex circuits for use in the slider scale packages 42 and the micromotor packages 44 are likewise capable of being mass produced. Several flex circuits can be made on a panel or sheet of suitable material. The sheet from which the flex circuits are formed typically comprises a polyimide substrate and conductive metal layer. The metal is either etched or deposited on the polyimide through a machining process to create the desired pattern of traces 66a–66f, leads 64, and solder bond pad areas 88, 90. Solder bond pads 88, 90 are typically formed of either gold or aluminum, and traces 66a–66f are typically formed of copper or gold plated copper. To connect the solder bond pads 88, 90 to the traces 66a–66f, the gold plated copper traces 66a–66f are first aligned at the bond pads 88, 90. Solder, ultrasonic welding, or a conductive adhesive can then be used to create a connection between the bond pads 88, 90 and the traces 66a–66f.

Solder bumps can then optionally be added to the flex circuits 62 using a screen printing process to apply a solder paste to the flex circuits. A mask may be placed on the flex circuit to allow the solder paste to be deposited at the desired locations on the flex circuits. The flex circuits are then moved through a reflow oven, which causes the solder paste to liquify, forming solder bumps having the desired volume and shape.

The next step is to affix the flex circuits to the micromotors 60 or sliders 12. The flex circuits are affixed to the slider 12 or micromotor 60 by connecting the ends of the leads 64 on the flex circuit to the appropriate bond pads on the slider 12 or micromotor 60. This connection may be formed by using solder, ultrasonic welding, conductive adhesives, or another suitable form of bonding. Because the leads 64 are unsupported by polyimide, they are free to bend. Thus, the flex circuit is folded and is adhesively attached to the back of the slider 12 or micromotor 60 using a suitable adhesive, epoxy, or bonding method. When completed, a slider scale package 42 comprises a slider 12 with a flex circuit 52 having solder bumps 54. Similarly, the micromotor package 44 comprises a micromotor 60 and flex circuit 62 having solder bumps 72.

To form a finished HGA, a slider package 42 and micromotor package 44 are placed on the suspension 46 using a well known pick and place manufacturing process. The slider package 42, micromotor package 44, and suspension 46 are then placed in a reflow oven, which is used to liquify the solder bumps 54, 72 so that a solder joint is formed, creating a connection between the slider package 42, micromotor package 44, and suspension 46 at the solder bumps 54, 72. The reflow process also precisely aligns the slider package 42 on the micromotor package 44, and the micromotor package 44 on the suspension 46 because a solder joint will not form in an area covered by a solder resist or cover coat.

Alternatively, the flex circuits may be created without solder bumps. Rather, the micromotor 60 may be manufactured with solder bumps 54, 72 applied on both its top surface and bottom surface. The top solder 54 bumps may be applied at the wafer level fabrication of the micromotors 60. The bottom solder bumps 72, just as described above, would appear on the bottom flex circuit 62, and may be deposited after the flex circuit 62 has been adhered to the micromotor 60. Once the flex circuit 62 is affixed to the micromotor 60 and solder bumps 54, 72 are applied, the HGA is assembled using a pick and place manufacturing process to place slider scale packages 42 and micromotor packages 44 on suspensions 46. The slider scale package 42, micromotor package 44, and suspension 46 are then placed in a reflow oven, which causes the solder bumps 54, 72 on the micromotor 60 to form solder joints. The resulting solder joints form the necessary electrical and mechanical connections between the slider 12, micromotor 60, and suspension 46.

Incorporating this packaging method into forming HGA's is particularly advantageous for several reasons. Manufacturing the HGA's using solder to form the connections between the slider scale package 42, micromotor package 44, and suspension 46 allows for testing and replacement of any possibly defective sliders 12 or micromotors 60. In the past, sliders and micromotors were permanently adhered to the suspension, making it impossible to rework the HGA. When using the present method of assembly, if testing shows either a defective R/W head or micromotor 60, the suspension can simply be reflowed until the solder joints become liquid, and the defective part can be removed. A new part can replace the defective one, and the HGA 40 can be reflowed to reform the solder joints and create a defect free assembly 40.

In addition, because much of the circuitry is formed on inexpensive flex circuits 52, 62, 74, rather than being formed during the manufacture of the slider 12 or micromotor 60, it is possible to standardize all parts of HGA assemblies, even if some components are obtained from different suppliers. It is relatively simple and cheap to create alternative flex circuits to address different pinout configurations for various R/W head suppliers. Pinout configuration refers to the polarity of the read elements and the write elements. Typically, there are two read bond pads, one R+ and one R−; and two write bond pads, one W+, and one W−. Depending on a particular suppliers' pinout configuration, the HGA may require different read/write signal paths to get the signal to the pre-amplifier. Thus, rather than being forced to use different pre-amplifiers for every pinout configuration used by different R/W head suppliers, a simple change in the path of the traces 66 on the flex circuits can be used to reverse the polarity as needed from the read elements and write elements.

Figure 4:
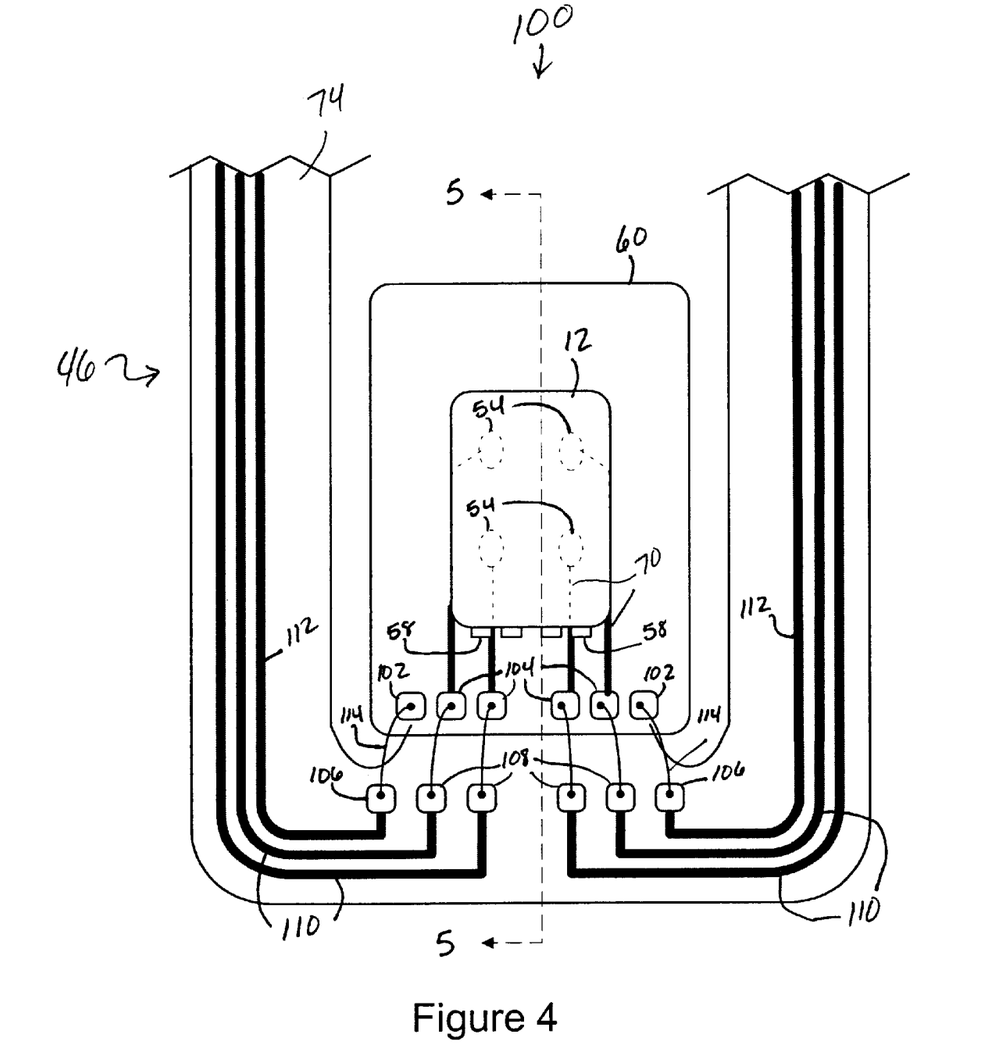
FIG. 4 is a top plan view of an HGA slider package, a micromotor package, and a suspension having a wire bond connection between the micromotor and suspension.

FIG. 4 shows an alternate HGA 100 having a slider 12 and a micromotor 60 on suspension 46. In FIG. 4, the HGA 100 is shown in a bottom plan view, so that the air bearing surface of the slider 12 is visible. On the micromotor 60 are two micromotor bond pads 102 and four head bond pads 104. The suspension 46 comprises a gimbal 74 with two micromotor bond pads 106 and four head bond pads 108. Also on gimbal 74 are four read/write (R/W) traces 110 and two micromotor traces 112. The R/W traces 110 on the gimbal 74 end at the four head bond pads 108. From the four head bond pads 108, wire bonds 114 connect the R/W traces 110 to the head bond pads 104. Similarly, the micromotor traces 112 end at the two micromotor bond pads 104, which are connected to the two micromotor bond pads 102 on the micromotor 60 by wire bonds 114. The embodiment of FIG. 4 differs from the embodiment shown above in FIG. 2 in that wire bonds 114 are used to electronically connect the micromotor 44 to the suspension 46.

Figure 5:
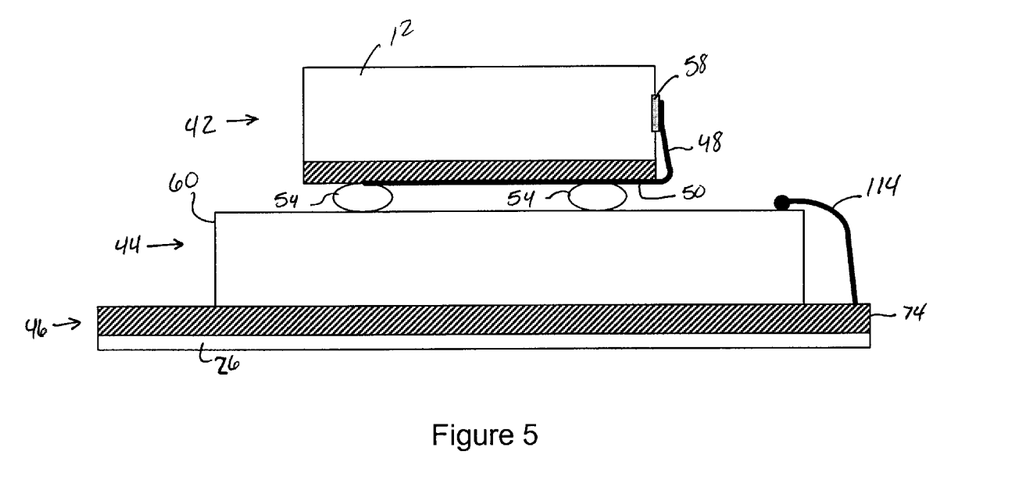
FIG. 5 is a cross section of the HGA in FIG. 4 taken along line 5—5.

FIG. 5 is a cross sectional view taken along line 5—5 of the HGA in FIG. 4 which more clearly shows the construction of the HGA 100. Visible is the slider scale package 42, a micromotor 60, and the suspension 46. Just as in the previous embodiment, solder bumps 54 are used to form electrical and mechanical connections between the slider package 42 and the micromotor package 44. However, solder bumps are not used to connect the micromotor package 44 to the suspension 46. Instead, wire bonds 114 provide the electrical connection between the micromotor 44 and the flex circuit 74 on the suspension 46, and the mechanical connection between the two is made by glueing or epoxying the micromotor 60 to the suspension 46.

In manufacturing the HGA 100 shown in FIG. 5, the slider scale package 42 is formed as described above by affixing a flex circuit 52 to a slider 12. The micromotor 60 fabrication is likewise similar to that disclosed above, although no flex circuit is affixed to the micromotor. The micromotor 60 must be fabricated with top circuitry (bond pads and traces), to aid in creating a connection between the micromotor 60 and the slider 12, and internal circuitry, to allow the micromotor 60 to be actuated at bond pads 102. The major difference in making the HGA 100 in FIG. 5 comes in is applying the wire bonds 114. One method of assembling the HGA's is to first affix the micromotor 60 to the suspension 46, and second add the wire bonds 114 connecting the micromotor 60 and the gimbal 74. Once the micromotor 60 is both adhered to the gimbal 74 and the wire bonds 114 formed, a slider scale package 42 is added, and the suspension 46, micromotor 60, and slider package 42 are passed through a reflow oven, and solder joints are created at the solder bumps 54.

The embodiment shown in FIG. 5 retains all the benefits listed above in relation to using a slider scale package 42 in the manufacture of HGAs. Specifically, it is much easier to rework the HGA and remove any defective R/W heads by simply reflowing the assembly until the solder joints become liquid. Once the solder is liquid, a defective slider can easily be removed and replaced with a non-defective component. It is not possible, however, to rework the micromotors 60 because they are permanently bonded to the suspension 46. In addition, the HGA 100 is relatively easy to mass produce, since it is possible to mass produce the sliders, micromotors, and flex circuits and automate the final assembly of all components to create finished HGAs 100.

Figure 6:
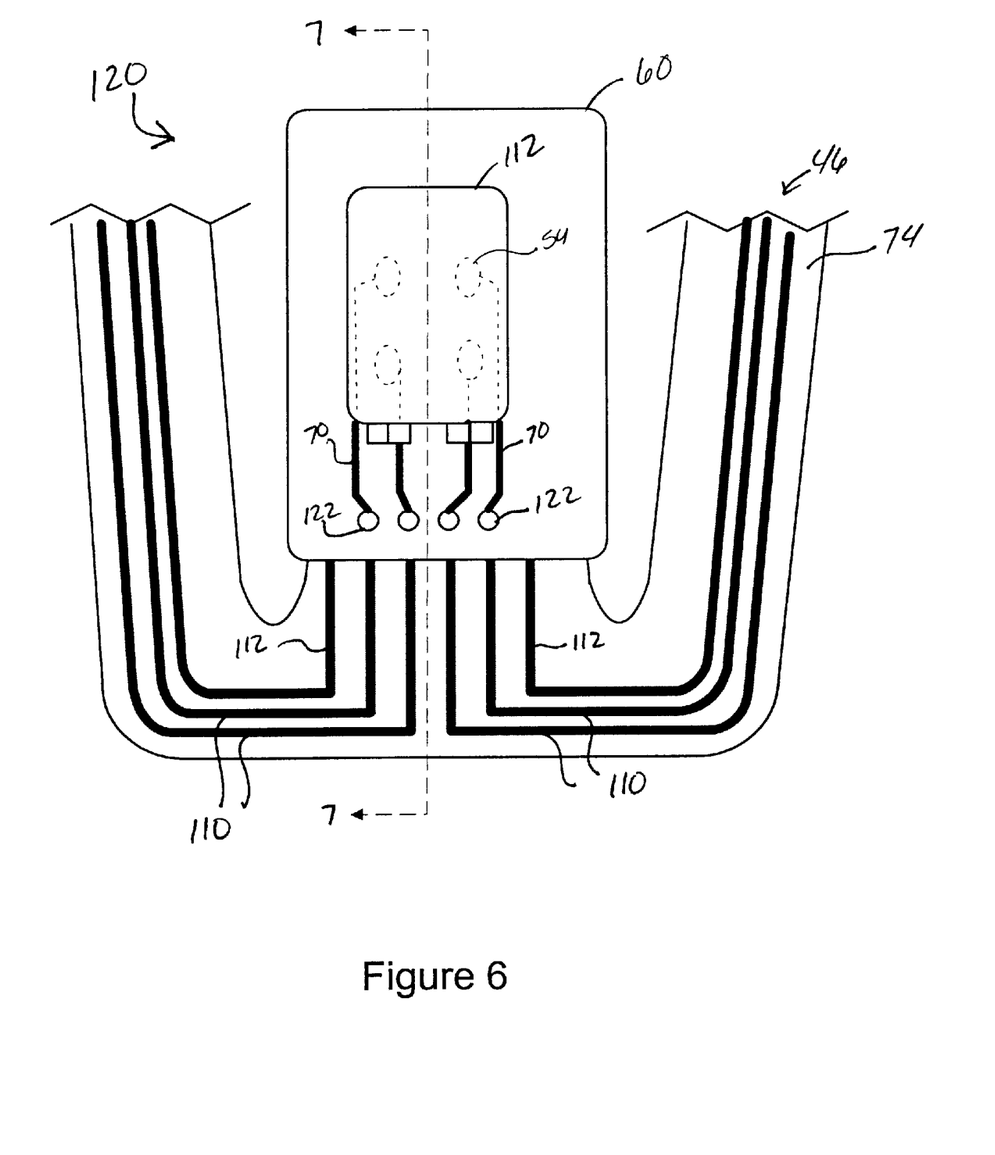
FIG. 6 is a top plan view of an HGA comprising a slider package, a micromotor and suspension, wherein the micromotor includes a via.

FIG. 6 is a top view of yet another embodiment of a head gimbal assembly 120 incorporating a slider scale package 42 and micromotor 60. Once again, the head gimbal assembly 120 comprises a slider 12, a micromotor 60, and a suspension 46. The suspension comprises a gimbal 74 and traces 110, 112. Visible on the micromotor 60 are traces 70 and several vias 122. The vias 122 provide the electrical connection between the slider 12 and the suspension 46 and, in connection with traces 70, function to allow signals from the R/W head carried by the slider 12 to be conducted to the gimbal 74. The traces 110, 112 located on the gimbal 74 are then used to conduct the read write signal up the length of the suspension 46 to a pre-amplifier circuit.

Figure 7:
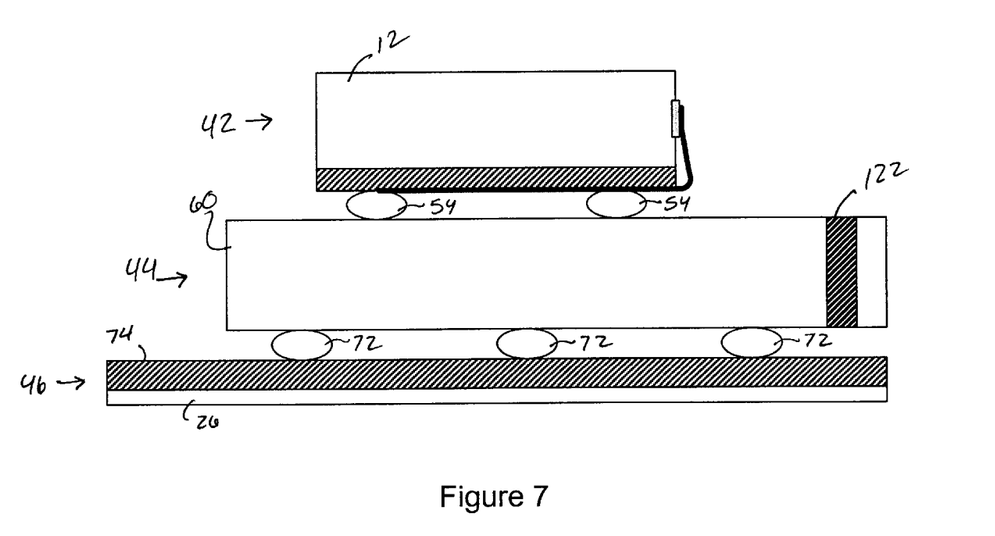
FIG. 7 is a cross section of the HGA in FIG. 6 taken along line 7—7.

FIG. 7 is a cross sectional view of the assembly of FIG. 6 taken along line 7—7 which more clearly shows the construction of the HGA 120. Visible is a slider scale package 42, a micromotor 60, and a suspension 46 comprising a gimbal 74 and load beam 26. Once again, electrical and mechanical connections between the slider scale package 42 and micromotor 60 are formed by solder bumps 54. In like manner, solder bumps 72 are used to create electrical and mechanical connections between the micromotor 60 and the gimbal 74. However, the micromotor 60 uses a system of vias 122, rather than a flex circuit or wire bonding, to allow signals to be passed from circuitry on the bottom of the micromotor 60 to circuitry located on the top of the micromotor 60.

Figure 8:
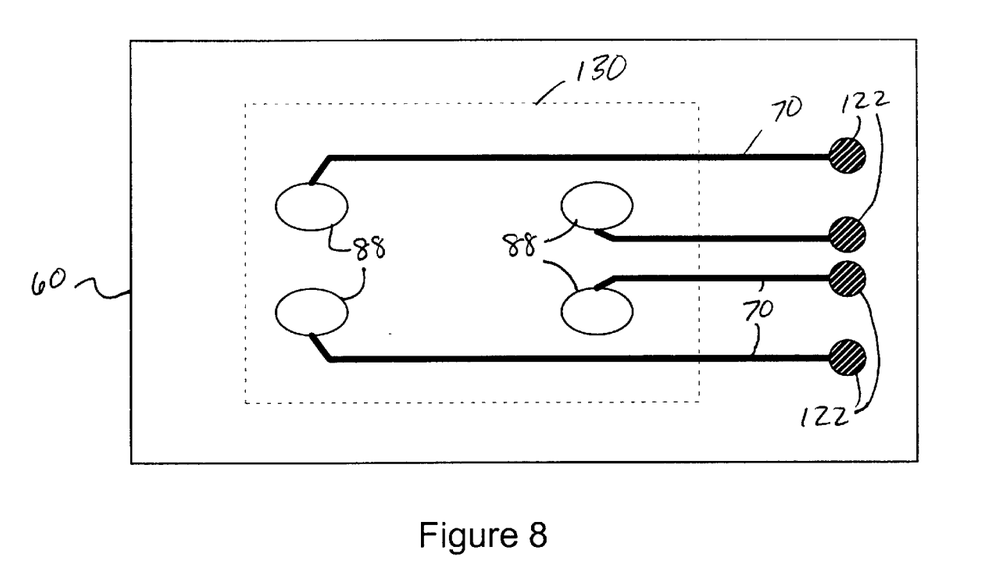
FIG. 8 is a top plan view of a micromotor.
Figure 9:
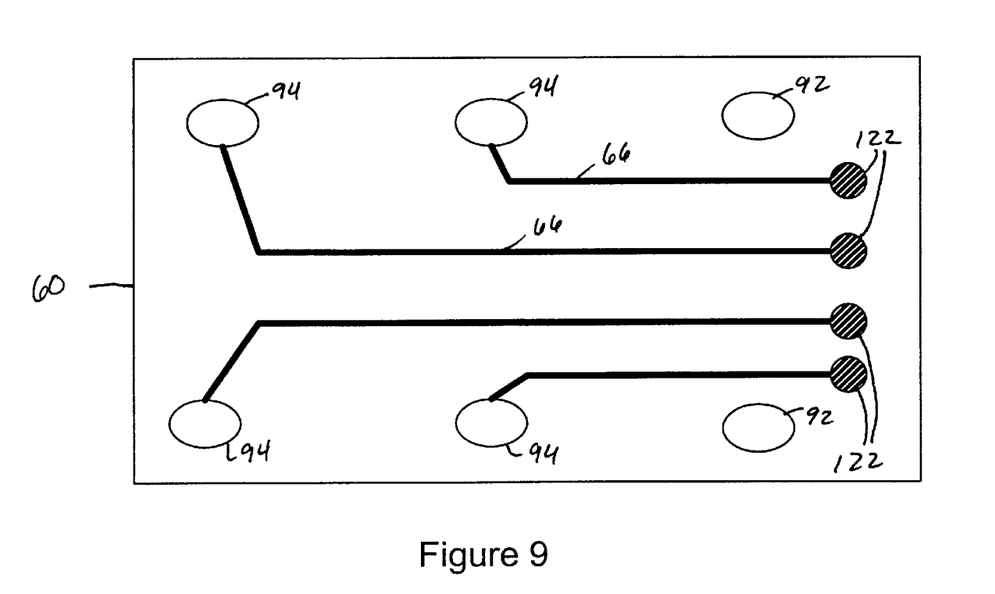
FIG. 9 is a bottom plan view of a micromotor.

FIGS. 8 and 9 provide top and bottom plan views, respectively, of the micromotor in FIG. 7 to more clearly show the micromotor's 60 top and bottom circuitry. The top view of FIG. 8 shows four head bond pads 88, four top traces 70, and four vias 122. Also shown is an outline 130 showing the location a slider is to be positioned on the micromotor 60. Head bond pads 88 correspond to the area where solder bumps 54 are applied. Traces 70 lead from the head bond pads 88 to vias 122. Traces 70 are used to conduct a R/W signal received from the slider to the vias 122. Vias 122 then conduct the R/W signal through the thickness of the micromotor 60.

FIG. 9 shows two first solder bond pads 92, four second solder bond pads 94, and bottom traces 66. The solder bond pads 92, 94 correspond to the location of solder bumps 72 which connect the micromotor 60 to the suspension 46. First solder bond pads 92 are used to actuate the micromotor 60 and connect to internal circuitry. Second solder bond pads 94 are used to transmit R/W signals from and to the suspension.

Bottom traces 66 connect the second solder bond pads 94 to the vias 122. Once a R/W signal is sent from a top trace 70 through a via 122, it travels along the bottom traces 66 to a second solder bond pad 94. From the solder bond pad 94, it can travel through a solder bump 72 to circuitry located on the suspension 46. Similarly, a write signal can be sent from the suspension 46, through solder bumps 72 to a second solder bond pad 94. From the solder bond pad 94, write signal travels along trace 66 to via 122, where the read signal travels to the top trace 70 and to corresponding head bond pad 88. From the head bond pad 88, the write signal can be sent to the slider 12, and the R/W head it carries.

Fabricating a micromotor 60 having top and bottom circuitry is more complex than forming a micromotor having a flex circuit. The micromotor 60 must be machined on not only the top surface, but also the bottom surface to form the circuitry. Though it is once again possible to do much of the trace and bond pad formation at the bar level, it is more complex to form traces and bond pads on two surfaces. In addition, vias 122 must be fabricate as part of the micromotor 60 as well. Vias 122 may be added at the wafer level in manner well known to those skilled in the art. Solder bumps may be added at either the wafer or bar level. Though it is more complex to fabricate the micromotor 60, several benefits of using such a micromotor 60 remain. Once again, the HGA is easily reworkable and testable. If a defective slider 12 or micromotor 60 is found, the assembly can simply be reflowed, and the defective component can be replaced with a new, functioning component.

Figure 10:
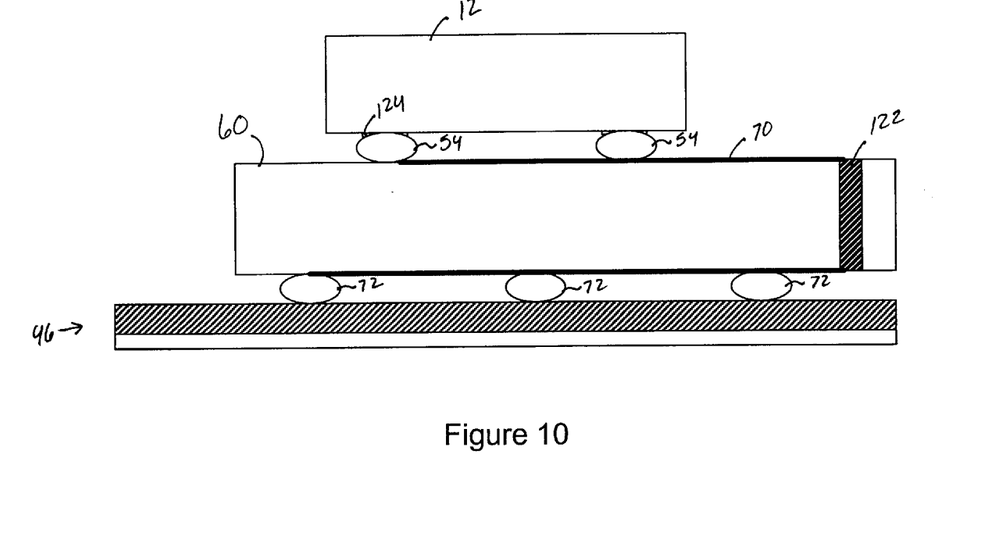
FIG. 10 is a cross sectional view of an HGA comprising a slider, micromotor, and suspension.

Yet another embodiment is shown in FIG. 10. FIG. 10 is a cross sectional view of a head gimbal assembly having a slider 12, micromotor 60, and suspension 46. The slider 12 is connected to the micromotor 60 at solder bumps 54. Similarly, the micromotor 60 is connected to the suspension 46 at solder bumps 72. The micromotor 60 uses a system of vias 122, as disclosed above, to allow signals from the slider to be passed through the micromotor 60 to the suspension 46. Micromotor 60 likewise comprises top and bottom circuitry as disclosed in FIGS. 8 and 9.

Figure 11:
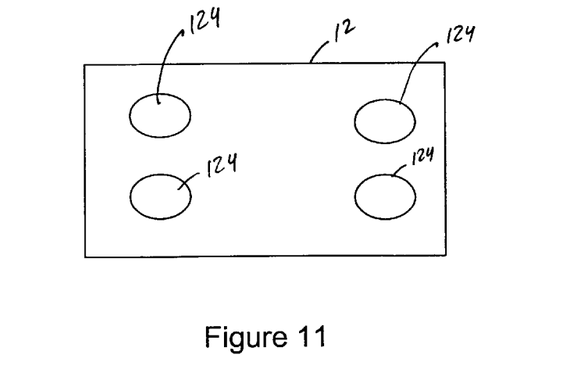
FIG. 11 is a plan view of the slider.

The slider 12 shown in FIG. 10 does not have an associated flex circuit. Rather, the slider 12 has bottom bond pads 124 to allow the R/W signal to be sent from the R/W head to the circuitry located on the micromotor 60. FIG. 11 is a plan view of the bottom of the slider 12 showing the location of bottom bond pads 124. When fabricated, the slider 12 must be created with internal circuitry which connects the bond pad areas 124 on the bottom of the slider 12 (as viewed in FIG. 10), to the R/W head carried by the slider 12. These connections are necessary to allow the R/W signal to be passed from the R/W head to the bottom bond pads 124. From the bottom bond pads 124, the R/W signal is conducted through solder bumps 54 to top traces 70 on the micromotor 60. Just as disclosed in the above embodiment, traces 70 and vias 122 on the micromotor 60 are then used to allow the R/W signal to pass through the micromotor 60 to the suspension 46.

Though it is more complex to manufacture sliders 12 and micromotors 60 for use in this embodiment, the result is increased ease of manufacture of the HGA. Solder bumps 54, 72 can be applied at the bar or wafer level to both sides of micromotor 60. Alternatively, solder bumps 54, 72 may be applied to one side of the slider 12 at the bar level, and to one side of the micromotor 60. Once the sliders 12 and micromotors 60 are fabricated, assembly of the HGA can be accomplished by pick and place manufacturing methods. Sliders 12 can be placed on micromotors 60, which are then placed on suspensions 46. The assembly can be passed through a reflow oven to create solder joints at the solder bumps 54, 72. Because the solder joints form both the mechanical and electrical connections between the slider 12, micromotor 60, and suspension 46, it is possible to test the assemblies and easily replace any defective components by reflowing the assembly, and replacing a defective component with a functioning component.

Although the present invention has been described with reference to preferred embodiments, workers skilled in the art will recognize that changes may be made in form and detail without departing from the spirit and scope of the invention.

What is claimed is:

1. A slider suspension assembly for selectively altering a position of a slider with respect to a rotatable disc, comprising:

a micromotor for positioning the slider with respect to a selected track on the disc; and means for electrically and mechanically interconnecting the micromotor and the slider on a suspension arm, wherein the means for electrically and mechanically interconnecting is located between a micromotor opposing surface of the slider and a slider opposing surface of the micromotor.

2. The slider suspension assembly of claim 1 wherein the means for electrically and mechanically interconnecting the micromotor and the slider on the suspension assembly comprises solder joints formed between the slider and micromotor.

3. The slider suspension assembly of claim 2 and further comprising a flex circuit incorporated on the micromotor opposing surface of the slider.

4. The slider suspension assembly of claim 3 and further comprising a flex circuit incorporated on a suspension opposing surface of the micromotor.

5. A slider suspension assembly for selectively altering a position of a transducing head with respect to a rotatable disc, comprising:

a slider carrying the transducing head and having an air bearing surface and a micromotor opposing surface;

a micromotor attached to the slider, the micromotor being responsive to electric control signals to selectively actuate the micromotor to alter the position of the slider and having a slider opposing surface and a suspension opposing surface;

a suspension for supporting the slider and micromotor above a rotating disc;

means for conducting a read/write signal between the slider and the suspension comprising a solder joint between the slider opposing surface of the micromotor and the micromotor opposing surface of the slider; and means for supplying the control signals to the micromotor.

6. The slider suspension assembly of claim 5 wherein the means for conducting a read/write signal between the slider and the suspension further comprise solder joints between the suspension opposing surface of the micromotor and the suspension, the solder joints forming an electrical and mechanical connection between the micromotor and suspension.

7. The slider suspension assembly of claim 6 wherein the means for supplying control signals to the micromotor comprises a flex circuit incorporated on the suspension opposing surface of the micromotor.

8. The slider suspension assembly of claim 5 wherein the means for conducting a read/write signal between the slider and the suspension further comprises a flex circuit incorporated on the micromotor opposing surface of the slider.

9. The slider suspension assembly of claim 5 wherein the means for conducting a read/write signal between the slider and suspension comprises wire bonds forming electrical connections between suspension and the slider opposing surface of the micromotor.

10. The slider suspension assembly of claim 5 wherein the means for supplying the control signals to the micromotor comprise solder joints forming an electrical and mechanical connection between the suspension opposing surface of the micromotor and the suspension.

11. The slider suspension assembly of claim 5 wherein the means for supplying the control signals to the micromotor comprises wire bonds forming an electrical connection between the suspension and the slider opposing surface of the micromotor.

12. A method for forming a slider suspension assembly operable to selectively position a transducing head relative to a rotatable disc, the method comprising:

forming a slider having a transducing head;

forming a micromotor having a means for actuating the micromotor;

forming a suspension for supporting the micromotor and the slider;

forming a connection between opposing surfaces of the slider and the micromotor, wherein the connection electrically and mechanically connects the slider to the micromotor and allows a read/write signal to pass between the slider and the micromotor; and electrically and mechanically connecting the micromotor to the suspension wherein the connection allows the read/write signal to pass between the micromotor and the suspension and allows an electronic control signal to pass between the suspension and the micromotor.

13. The method of claim 12 wherein the micromotor and suspension are electrically and mechanically connected by forming solder joints between a suspension opposing surface of the micromotor and the suspension.

14. The method of claim 12 wherein forming a connection between the micromotor and the slider comprises forming solder joints between the opposing surfaces of the micromotor and the slider.

15. The method of claim 14 and further comprising forming a slider flex circuit on a micromotor opposing surface of the slider to form a slider package.

16. The method of claim 15 and further comprising forming a micromotor flex circuit on the suspension opposing surface of the micromotor to form a micromotor package.

17. The method of claim 16 and further comprising forming solder bumps on the slider flex circuit at bond pad areas.

18. The method of claim 17 and further comprising forming solder bumps on the micromotor flex circuit at bond pad areas.

19. The method of claim 18 and further comprising:
 aligning the slider package with the micromotor package;
 aligning the micromotor package on a suspension; and
 reflowing the solder bumps to form the connections between the slider package and micromotor package, and the micromotor package and the suspension.

20. The method of claim 12 wherein the micromotor and suspension are mechanically connected by bonding the micromotor to the suspension, and the micromotor and the suspension are electrically connected by forming wire bonds between the micromotor and the suspension.

* * * * *